United States Patent Office 3,660,533
Patented May 2, 1972

3,660,533
FLAME-RESISTANT BLOCK COPOLYMERS
William O. Drake and Donnie G. Brady, Bartlesville,
Okla., assignors to Phillips Petroleum Company
No Drawing. Filed July 29, 1970, Ser. No. 59,347
Int. Cl. C08f 37/00, 45/00
U.S. Cl. 260—878 B                    6 Claims

ABSTRACT OF THE DISCLOSURE

Ethylene-propylene block copolymers are rendered flame-resistant by incorporation therein of a flame-retardant system consisting of a mixture of brominated and chlorinated bis(cycloalkenyl) compounds and antimony trioxide.

---

This invention relates to flameproofing olefin block copolymers and flame-retardant systems therefor.

While many additive systems have been formulated for the purpose of rendering polyolefins such as polyethylene, polypropylene, and polyisobutylene flame-resistant, such systems are not satisfactory for use in all such polyolefins. Thus, prior to this invention, satisfactory flame-resistant properties could not be imparted to block copolymers of ethylene and propylene without adversely affecting the desirable physical properties of the polymers. This difficulty is believed due to the effect of the high loading of the additive which is required with the previously known additive systems in order to achieve any degree of flame resistance.

Accordingly, it is an object of this invention to provide a flame-resistant ethylene-propylene copolymer composition.

Other aspects, objects and the several advantages of the invention will be readily apparent to one skilled in the art from a study of this disclosure and the appended claims.

In accordance with the present invention, we have discovered that the addition of a flame-retardant system consisting of a mixture of a brominated and a chlorinated bis(cycloalkenyl) compound and antimony trioxide to block copolymers of ethylene and propylene results in polymeric compositions which are rendered satisfactorily flame-resistant without adverse effects on the physical properties of the host copolymers.

The block polymers suitable in the practice of the invention include those in which the major block comprises crystalline polypropylene and the minor block comprises linear polyethylene. The presently preferred block polymer consists of a major segment comprising about 70–95 weight percent crystalline polypropylene and a minor segment comprising about 30–5 weight percent of a copolymer of ethylene and propylene. The structure of the minor segment is not clearly understood but is thought to consist primarily of relatively long random copolymer blocks interspersed randomly with short polyethylene sequences. Studies have shown that the amount of ethylene contained in the minor block of the polymer ranges from about 40 to 80 weight percent, depending upon polymerization conditions. The propylene content of the total polymer thus ranges from about 76–98 weight percent and ethylene content ranges from about 24–2 weight percent.

The brominated and chlorinated bis(cycloalkylenyl) components of the inventive additive system are formed by the bromination or chlorination of a bis cycloalkenyl compound and have the general formula

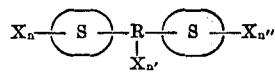

in which the circles represent cycloalkyl groups having 5 to 8 carbon atoms, X is chlorine or bromine wherein all halogens on the molecule are the same, R is a saturated acyclic hydrocarbon radical having 1 to 4 carbon atoms, and the values of $n$, $n'$ and $n''$ are selected such that the total halogen content of the compound is in the range of 30 to 90 weight percent. Examples of compounds that can be used are:

bis(2,5-dibromocyclopentyl)dibromomethane
1,2-bis(3,4-dibromocyclohexyl)-1,2-dibromoethane
bis(3,5-dichlorocyclohexyl)ethane
bis(2,4,6-tribromocycloheptyl)methane
1,3-bis(3,5,7-trichlorocyclooctyl)-2,2-dichloropropane
2,3-bis(2,3,4,5,6-pentabromocyclohexyl)-1,4-dibromobutane
1,4-bis(2,3,4,5,6,7,8-heptabromocyclooctyl)-1,2,3,4-tetrabromobutane
1-(2,5-dibromocyclopentyl)-2-(3,4-dibromocyclohexyl)-3-bromopropane
1,3-bis(3,4,5-tribromocyclohexyl)-2-dibromomethylpropane and the like.

It is also within the scope of this invention to incorporate the halogenated compound together with antimony trioxide in the composition. The antimony trioxide is used in amounts of 1 to 20 parts per 100 parts of composition. The halogenated compound should be used in an amount in admixture with the composition such that the total available halogen in the formulation is at least 0.2 weight percent. A weight ratio of halogen compound to antimony trioxide of 2:1 is frequently used, but other ratios are operable.

In a presently preferred embodiment of this invention, the retardant system consists of a mixture of (a) 1,2-bis(3,4 - dibromocyclohexyl)-1,2-dibromoethane ($Br_6BCE$), (b) 1,2 - bis(3,4 - dichlorocyclohexyl) - 1,2 - dichloroethane ($Cl_6BCE$) and (c) antimony trioxide, wherein the weight ratio of (a) to (b) is about 5:1 to 1:5.

The flameproofing agents according to this invention are relatively nonvolatile and practically odorless.

The production of the flame-resistant compositions can be carried out in various manners. For example, intimate mixtures of block polymer and flame-retardant agents according to the present invention can be prepared by mixing the block polymer and the bromine and chlorine compounds at an elevated temperature in an extrusion press or a kneader. The chlorinated and brominated components can also be dissolved in a common solvent, the solution admixed with the polymer, and the solvent subsequently removed.

It is to be understood that the compositions of this invention also can have incorporated therein the usual fillers, dyes, pigments, plasticizers, antistatic agents, stabilizing agents, and the like, if desired. Such compounds are well known in the art.

From a practical standpoint, it is desirable not to exceed about a 60, and preferably a 30, weight percent total loading of the polymer since otherwise important physical properties such as impact resistance and processability are adversely affected.

The flame-retardant additive systems of this invention can be added in the following amounts (parts additive per 100 parts polymer):

|  | Broad | Preferred |
|---|---|---|
| (a) $Br_6BCE$ | 1.5–20 | 5–10 |
| (b) $Cl_6BCE$ | 1.5–20 | 5–10 |
| (c) $Sb_2O_3$ | 1–20 | 7–15 |

The invention is further illustrated in the following example, but it is to be understood that the invention is not limited to this specific example. The parts specified in the example are parts by weight of additive per 100 parts of polymer.

EXAMPLE

Three sample compositions, utilizing as the block copolymer therein an ethylene-propylene block copolymer having a polypropylene segment consisting of about 87 weight percent of the total polymer and a 13 weight percent segment consisting of a random copolymer of ethylene and propylene containing about 6 weight percent ethylene, were compounded using as flame retardants the additive system indicated in the table below. Included in each formulation as a thermal stabilizer was 0.3 part of tetrakis[methylene(3,5 - di-tert-butyl-4-hydroxyhydrocinnamate)]methane. The resulting block copolymer compositions were tested in accordance with ASTM D635–56T using molded specimens of each resulting composition. The following results were obtained:

| Composition Number | Additive, php. | | | Burning test classification |
|---|---|---|---|---|
|  | $Cl_6BCE$ | $Br_6BCE$ | $Sb_2O_3$ |  |
| 1 | 15 |  | 10 | Burning. |
| 2 |  | 15 | 10 | Do. |
| 3 | 7.5 | 7.5 | 10 | Self-extinguishing. |

Reasonable variations and modifications of the above disclosure can be made, or followed, without departing from the spirit and scope thereof.

We claim:

1. A flame-resistant polymeric composition comprising a block copolymer of ethylene and propylene having therein a flame-retardant system consisting of a mixture of at least one brominated and one chlorinated compound selected form those of the formula

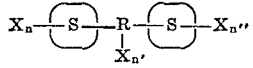

in which the circles represent cycloalkyl groups having 5 to 8 carbon atoms in the ring, X represents chlorine or bromine substituted on the carbon atoms wherein all halogens on the molecule are the same, R is a saturated acyclic hydrocarbon radical having 1 to 4 carbon atoms, and the values of $n$, $n'$ and $n''$ are selected such that the total halogen content of the compound is in the range of 30 to 90 weight percent and the total available halogen is at least 0.2 weight percent of said mixture, and antimony trioxide, wherein each of said chlorinated and said brominated compounds is present in an amount in the range of 1.5 to 20 parts by weight and said antimony trioxide is present in an amount in the range of 1 to 20 parts by weight per 100 parts copolymer, and wherein the ratio of said brominated compound to said chlorinated compound is in the range of 5:1 to 1:5.

2. A composition according to claim 1 wherein said block copolymer is formed of a polypropylene segment and a random ethylene-propylene copolymer segment.

3. A composition according to claim 1 wherein said brominated compound is 1,2-bis(3,4-dibromocyclohexyl)-1,2-dibromoethane and said chlorinated compound is 1,2-bis(3,4-dichlorocyclohexyl)-1,2-dichloroethane.

4. A composition according to claim 3 wherein the ratio of said brominated compound to said chlorinated compound is about 1:1.

5. A flame-retardant composition which comprises a mixture of at least one brominated and one chlorinated compound selected from those of the formula

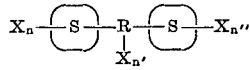

in which the circles represent cycloalkyl groups having 5 to 8 carbon atoms in the ring, X represents chlorine or bromine substituted on the carbon atoms wherein all halogens on the molecule are the same, R is a saturated acyclic hydrocarbon radical having 1 to 4 carbon atoms, and the values of $n$, $n'$ and $n''$ are selected such that the total halogen content of the compound is in the range of 30 to 90 weight percent and the total available halogen is at least 0.2 weight percent of said mixture, and antimony trioxide wherein the ratio of said brominated compound to said chlorinated compound is in the range of 5:1 to 1:5, and said antimony trioxide is present in an amount in the range of 0.025 to 6.67 parts per part of mixture of said brominated and said chlorinated compounds.

6. A system according to claim 5 wherein said brominated compound is 1,2-bis(3,4-dibromocyclohexyl)-1,2-dibromoethane and said chlorinated compound is 1,2-bis(3,4-dichlorocyclohexyl)-1,2-dichloroethane.

References Cited

UNITED STATES PATENTS

| 2,924,532 | 2/1960 | Dereich | 252—8.1 |
| 3,133,038 | 5/1964 | Hahn | 260—45.75 |
| 3,141,860 | 7/1964 | Sauer et al. | 260—45.75 |

JOSEPH L. SCHOFER, Primary Examiner

A. HOLLER, Assistant Examiner

U.S. Cl. X.R.

252—8.1; 260—33.8, 45.75, DIG 24